(12) United States Patent
Faris et al.

(10) Patent No.: US 6,801,270 B2
(45) Date of Patent: Oct. 5, 2004

(54) BACKLIGHT FOR A LIQUID CRYSTAL DISPLAY HAVING HIGH LIGHT-RECYCLING EFFICIENCY

(75) Inventors: Sadeg M. Faris, Pleasantville, NY (US); Aharon Hochbaum, Berkeley, CA (US); Wnehua Niu, Sunnyvale, CA (US); Jiang Yingqiu, Sunnyvale, CA (US)

(73) Assignee: Reveo, Inc., Elmsford, NY (US)

(*) Notice: Subject to any disclaimer, the term of this patent is extended or adjusted under 35 U.S.C. 154(b) by 67 days.

(21) Appl. No.: 09/893,163

(22) Filed: Jun. 27, 2001

(65) Prior Publication Data

US 2002/0051103 A1 May 2, 2002

Related U.S. Application Data

(60) Provisional application No. 60/214,107, filed on Jun. 26, 2000.

(51) Int. Cl.[7] .......................... G02F 1/1335; F21V 9/00; H04B 10/12; G02B 6/04; G02B 6/10
(52) U.S. Cl. ...................... 349/61; 362/511; 359/341.1; 385/115; 385/119; 385/123; 385/146; 385/147; 385/901
(58) Field of Search .............................. 349/61; 362/511; 359/341.1; 385/115, 119, 123, 146, 147, 901

(56) References Cited

U.S. PATENT DOCUMENTS

| | | | |
|---|---|---|---|
| 4,417,412 A | * 11/1983 | Sansom | 40/548 |
| 4,456,336 A | * 6/1984 | Chung et al. | 350/338 |
| 5,691,789 A | 11/1997 | Li et al. | |
| 6,004,315 A | * 12/1999 | Dumont | 606/15 |
| 6,034,753 A | 3/2000 | Li et al. | |
| 6,188,460 B1 | * 2/2001 | Faris | 349/176 |

FOREIGN PATENT DOCUMENTS

| | | | |
|---|---|---|---|
| JP | 357089706 | * | 6/1982 |
| JP | 406138458 | * | 5/1994 |
| WO | WO 98/11275 | | 3/1998 |

OTHER PUBLICATIONS

Hochbaum, A.; Jiang, Y.; Li, L.; J Vartak, S.; Faris, S. (1999) 51.3: Cholesteric Color Filters: Optical. Characteristics, Light Recycling and Brightness Enhancement, "SID 1999 Digest", pp. 1063–1065.

* cited by examiner

Primary Examiner—Robert H. Kim
Assistant Examiner—Hoan C. Nguyen
(74) Attorney, Agent, or Firm—Sampson & Associates, PC

(57) ABSTRACT

A backlight for a liquid crystal display (LCD) employing light recycling. In one embodiment the backlight includes a light guide fabricated from a substantially non-absorptive material and a reflective layer fabricated from a highly reflective material. In another embodiment the backlight includes a light source, a bundle of optical fibers, and a reflective layer fabricated from a highly reflective material, wherein the bundle of optical fibers is configured to receive light from the light source and distribute it to the reflective layer.

21 Claims, 4 Drawing Sheets

BACKLIGHT FOR A LIQUID CRYSTAL DISPLAY HAVING HIGH LIGHT-RECYCLING EFFICIENCY

This application claims the benefit of U.S. Provisional Patent Application Ser. No. 60/214,107, entitled Novel System Design for a Display with High Light Recycling Efficiency, filed Jun. 26, 2000.

BACKGROUND OF THE INVENTION (1) Field of the Invention

The present invention relates to liquid crystal display devices. This invention more specifically relates to a novel backlight, which may provide for highly bright and efficient liquid crystal display devices. Even more specifically it relates to displays that use the mechanism of light recycling to provide brighter appearance.

(2) Background Information

The demand for liquid crystal displays (LCDs) has increased substantially in recent years with the proliferation of computer technology and portable electronic applications. LCDs are further considered by many to be the most promising technology for meeting the demands of future flat panel display applications.

In general, as shown in FIG. 1, a conventional LCD includes the following three basic components: (i) a backlight 10 for producing a plane of relatively uniform intensity light; (ii) an electrically-addressable array 20 of spatial-intensity modulating elements for modulating the spatial intensity of the plane of light transmitted therethrough; and (iii) an array of absorptive color filtering elements 30 in registration with the array of spatial-intensity modulating elements, for spectrally filtering the intensity of modulated light transmitted therethrough to form a color image.

Backlight 10 generally includes one or more light sources 11 (e.g., thin fluorescent tubes), a light guide 12, at least one diffuser element 13 positioned optically downstream of light guide 12, and a highly reflective (e.g., white) film 14 positioned optically upstream of light guide 12, which serves to reflect light back into the display. Electrically addressable array 20 generally includes a linear polarizer 21, a layer that includes the addressing circuitry (e.g., thin-film transistors (TFTs), capacitors, and buslines) 22, a liquid crystal (LC) cell 23, which is often in a 90° twisted nematic configuration, and one or more glass substrates 24. Filtering array 30 typically includes a pixilated absorptive color filter 31, another linear polarizer 32 and one or more glass substrates 33.

It is well known that one of the principle shortcomings of a conventional LCD is poor light transmission efficiency (i.e., a high percentage of the light generated by backlight 10 is absorbed by the various LCD components). The light efficiency of a typical, conventional LCD panel is generally about 5% to 10%. The light transmission efficiency of conventional LCD panels tends to be substantially degraded by the following factors: (i) absorption of light by two absorption-type polarizers, (ii) absorption of light by absorption-type spectral filters, (iii) absorption of light reflected off TFTs and/or wiring, (iv) absorption of light by the black-matrix used to spatially separate the subpixel filters, and (v) Fresnel losses owing to mismatching of refractive indices between layers. As a result, it tends to be difficult to produce highly bright images from a conventional LCD panel without using ultra-high intensity backlighting systems, which require substantial electrical power input and generate a significant amount of excess heat.

Recently, Faris, in U.S. Pat. No. 6,188,460 (hereinafter referred to as the Faris patent), disclosed a LCD employing a systematic light-recycling scheme in order to eliminate the light energy losses associated with conventional displays. The Faris patent is fully incorporated herein by reference. In the optical recycling scheme disclosed therein, polarized light is transmitted from the backlight to those components in the LCD where spatial intensity modulation and spectral filtering occurs. Light that is not transmitted to the display surface (i.e., to a viewer) tends to be reflected back (rather than being absorbed) along the projection axis into the backlight for recycling and retransmission through the backlight for reuse by both the same and neighboring subpixels. The end result of the light recycling process is a brighter display since it converts a higher portion of the light into a usable form than conventional systems.

Notwithstanding the substantial improvements disclosed in the Faris patent, there remains a need for an improved LCD that is capable of efficiently producing high brightness color images. More particularly there is a need for a backlight that provides for highly efficient light recycling.

SUMMARY OF THE INVENTION

In one aspect the present invention includes a backlight for a liquid crystal display employing light recycling. The backlight includes a light source, a light guide fabricated from a substantially non-absorptive material, the material being selected from the group comprising acrylic, polycarbonate, and poly (methyl-methacrylate), wherein the light guide absorbs less than 5% of reflected light energy incident thereon, and a reflective layer fabricated from a highly reflective material, the material being selected from the group comprising aluminum, silver, barium sulfate, magnesium oxide, and organic materials, wherein the reflective layer reflects at least 95% of the light energy incident thereon. In a further aspect, this invention includes a liquid crystal display including an electrically addressable array including a liquid crystal cell, a substantially non-absorptive filtering array, a broadband polarizer, and the backlight described hereinabove in this paragraph.

In another aspect this invention includes another embodiment of a backlight for a liquid crystal display employing light recycling. The backlight includes a light source, a bundle of optical fibers, the optical fibers including an optically upstream side and an optically downstream side, the optical fibers further including a cladding material, and a reflective layer fabricated from a highly reflective material, the material being selected from the group comprising aluminum, silver, barium sulfate, magnesium oxide, and organic materials, wherein the reflective layer reflects at least 95% of the light energy incident thereon. The optical fibers are further configured to receive light from the light source and distribute the light to the reflective layer. In a still a further aspect, this invention includes a liquid crystal display including an electrically addressable array including a liquid crystal cell, a substantially non-absorptive filtering array, a broadband polarizer, and the backlight described hereinabove in this paragraph.

In still another aspect, this invention includes a method for fabricating a backlight for a liquid crystal display. The method includes providing a light source, providing a reflective layer fabricated from a highly reflective material, the material being selected from the group comprising aluminum, silver, barium sulfate, magnesium oxide, and organic materials, wherein the reflective layer reflects at least 95% of the light energy incident thereon, and providing a bundle of optical fibers, the optical fibers including an optically upstream side and an optically downstream side, the optical fibers further including a cladding material. The method further includes positioning the optically upstream side of the optical fibers in operative engagement with the light source and positioning the optically downstream side of the optical fibers in operative engagement with the reflective layer. To fabricate a LCD including a fiber optic backlight, the method may further include superposing a substantially non-absorptive spectral filtering array with the reflective layer and superposing an electrically addressable array including a liquid crystal cell with the reflective layer.

DETAILED DESCRIPTION

Figure 3:
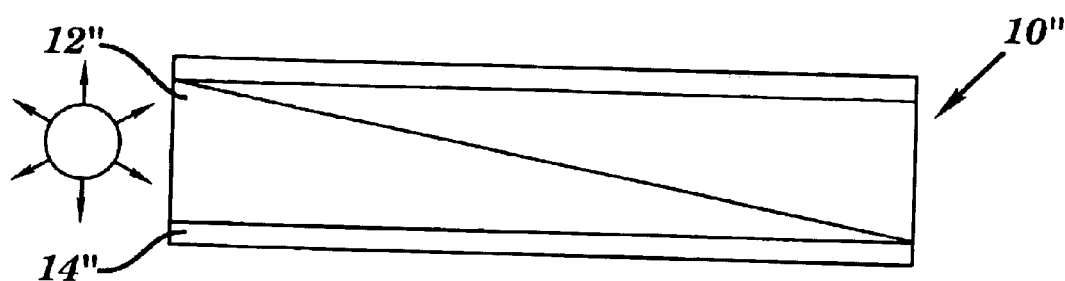
FIG. 3 is a cross sectional schematic representation of one embodiment of a backlight of the present invention.
Figure 4:
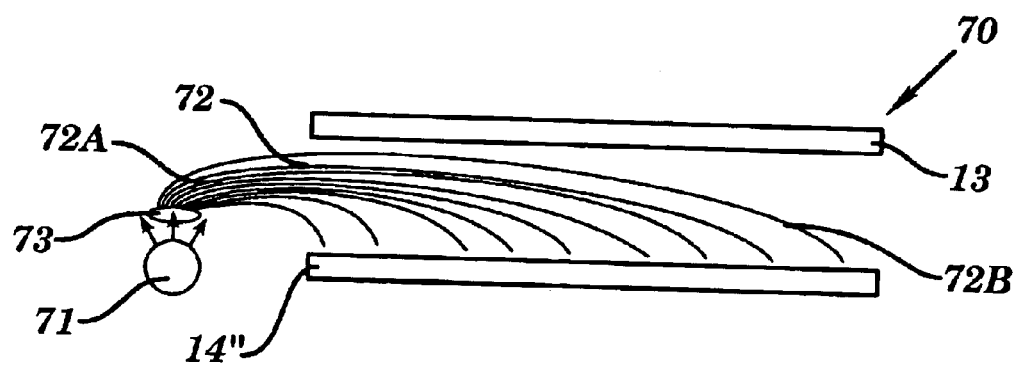
FIG. 4 is a cross sectional schematic representation of another embodiment of a backlight of this invention.

The present invention includes a backlight for a liquid crystal display (LCD) that may provide for highly efficient light recycling and therefore a bright and efficient LCD. In one embodiment (as shown in FIG. 3), the backlight 10" of this invention includes light guide 12", which is constructed of a substantially non-absorptive material and a reflective layer 14', which is constructed of a highly reflective material. In another embodiment (as shown in FIG. 4), the backlight 70 of this invention includes a bundle of optical fibers 72 in place of a typical light guide. The bundle of optical fibers may provide for efficient transmission of light from a light source to the display. The backlight of this invention may be advantageous over those of the prior art in that it may provide for very low loss in the backlight which is an important feature for highly efficient light recycling. This invention is still further advantageous in that it may enable the benefits of light recycling to be more fully realized. The backlight of this invention is still further advantageous in that it may provide for highly bright and efficient LCDs.

One aspect of the present invention was the realization that many unanticipated light losses occur in the backlight when a light recycling scheme is employed. The Faris patent, while disclosing a LCD panel with substantially increased theoretical light efficiency, did not anticipate light energy losses that may be associated with the backlight. These losses typically include light absorption in the various components of the backlight as well as edge and back leakage. A typical backlight unit may lose up to 35% of the light energy incident thereon (e.g., light reflected back into the backlight by the light recycling components). The light energy loss is typically further exacerbated since much of the light traverses the backlight multiple times on the average (since it undergoes multiple reflections) before being transmitted from the LCD as display information. For example, if the recycled light is required to traverse the backlight unit on average three times during the recycling process then cumulative loss in the backlight unit may be as high as 70% of the recycled light energy. The losses in the backlight unit may, therefore, eliminate a substantial portion of the anticipated gain from an LCD employing a light recycling system.

Figure 2A:
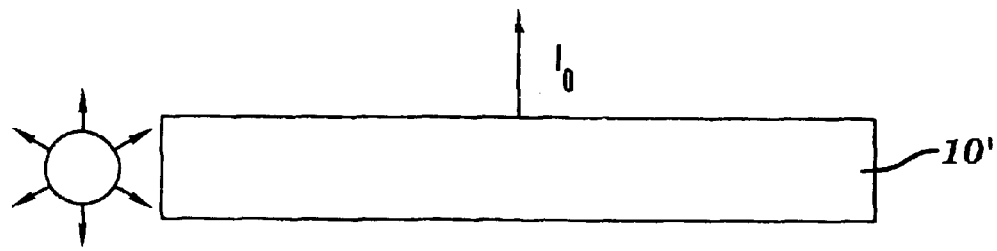
FIG. 2A is a cross sectional schematic representation of a backlight shown for computational purposes.
Figure 2B:
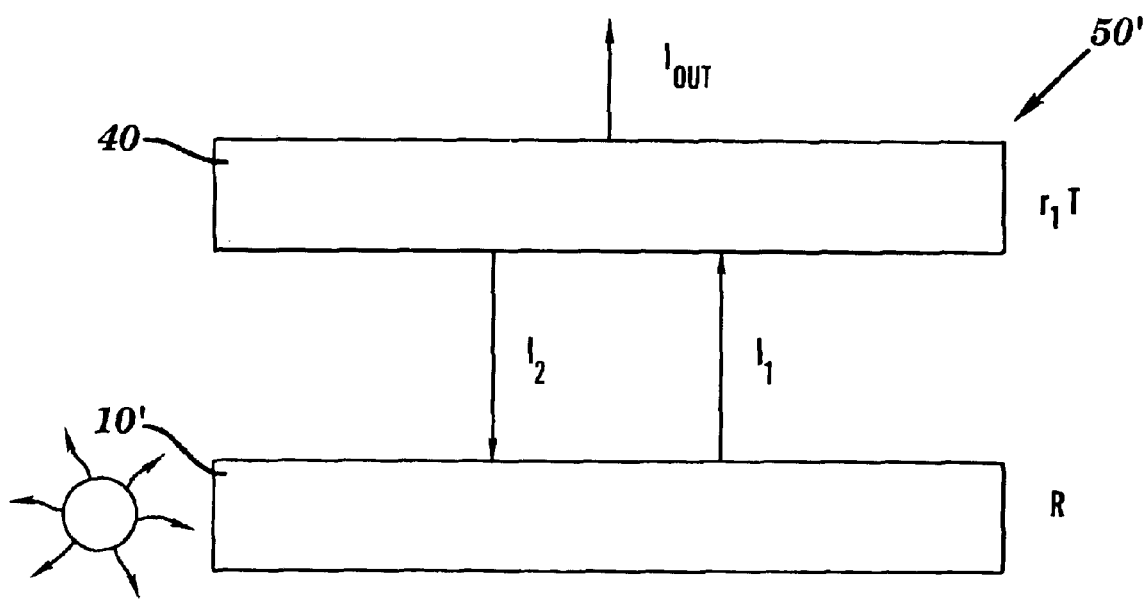
FIG. 2B is a cross sectional schematic representation of a LCD employing light recycling, including the backlight of FIG. 2A, shown for computational purposes.

Referring now to FIGS. 2A and 2B, a schematic depiction of a backlight 10' that delivers light of brightness $I_0$ (FIG. 2A) and a LCD 50' including backlight 10' and a display 40 (FIG. 2B) are shown for computational purposes. Backlight 10' reflects only a fraction R of the light $I_2$ that is incident on it from the display direction (i.e., light reflected back to the backlight from display 40). The total loss in the backlight, 1-R, consists of absorption and light leakage through the edges and the back. Typical values for R are 0.65 to 0.85. The values r and T indicate the reflection and transmission, respectively, of display 40. Display 40 reflects a fraction r of the incident light $I_1$ back towards backlight 10'. In a conventional LCD, the value of r is typically in the range of 0.04 to 0.08. In such an arrangement, the display output brightness, $I_{out}$ does not depend strongly on the value of R and the multiple inter-reflections between display 40 and backlight 10' may be neglected. On the other hand, in a light recycling system where r may be in the range of 0.5 to 0.7, the brightness becomes very sensitive to the value of R (i.e., to the losses in the backlight).

In one exemplary calculation, a conventional LCD is considered. It is assumed in this example that for the light recycling calculation, r=0.05 in a conventional display. It may be calculated that $I_{out}$ decreases by less than 2% as the backlight reflectivity is varied from R=0.85 to R=0.65. In another exemplary calculation, a light-recycling LCD is considered. It is assumed in this example that r=0.67. It may be calculated that $I_{out}$ decreases by 23.5% as the backlight reflectivity is varied from R=0.85 to R=0.65. In the R=0.85 case, 34.6% of the recyclable light is lost. As the backlight reflectivity is reduced to R=0.65, 61.8% of the recyclable light is lost. For comparison, if the backlight losses could be reduced such that R=0.95 only 13.6% of the recyclable light would be lost.

The first example shows that the brightness for a conventional LCD is generally independent of the reflection efficiency R of the backlight, with a drop in R from R=0.85 to R=0.65 causing less than a 2% drop in the light output. Therefore, the need for a backlight having high reflection efficiency has not been previously recognized. However, the second example demonstrates that the brightness of a LCD designed for systemic light recycling may be highly sensitive to the reflection efficiency R of the backlight. A LCD having a backlight with high reflection efficiency and employing a systemic light-recycling scheme may have substantially improved light efficiency and brightness as compared to the prior art.

Figure 1:
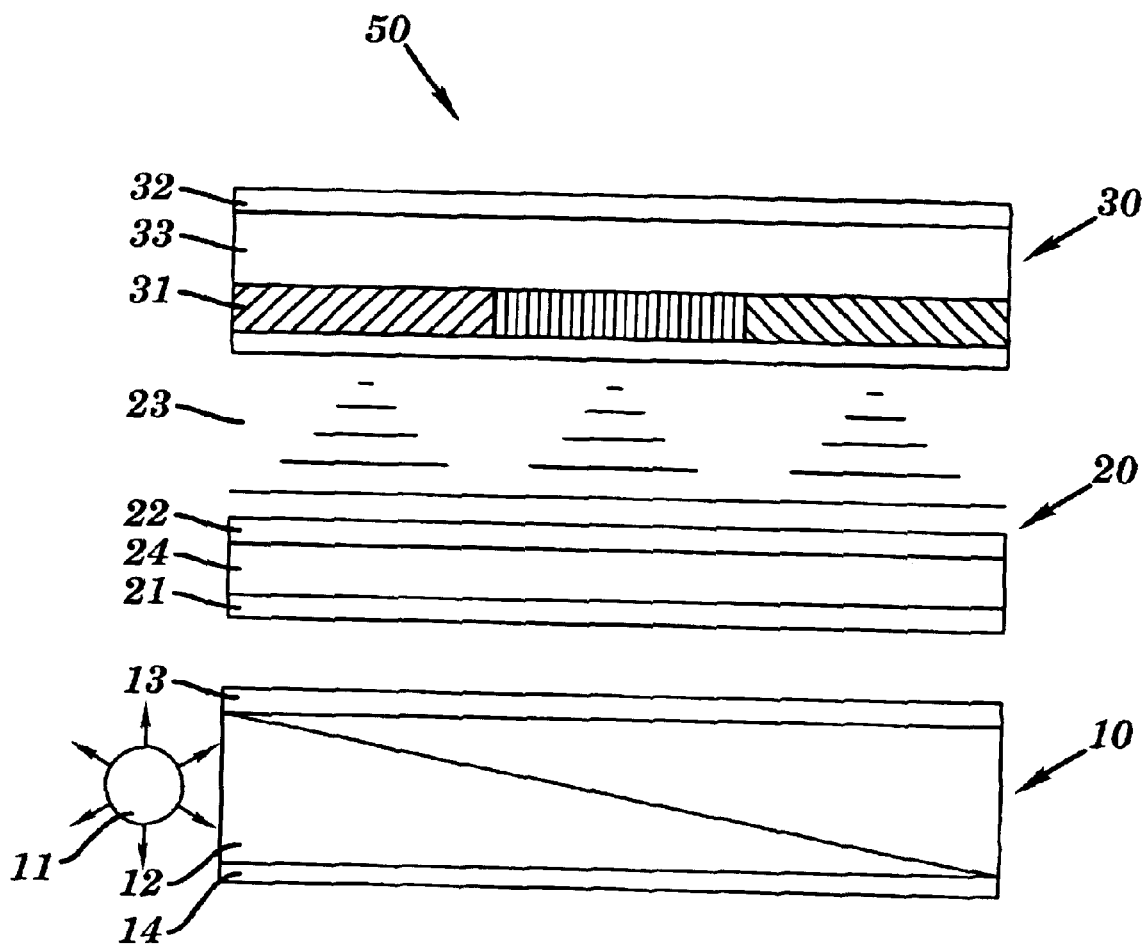
FIG. 1 is a cross sectional, partially exploded schematic representation of a prior art LCD.

Referring to FIG. 3, a first embodiment of the backlight 10" of this invention is illustrated. Backlight 10" is similar to a conventional backlight 10 (FIG. 1) with the exception that the individual components have been configured to have minimal losses. In a generally desirable embodiment, backlight 10" as a whole, reflects at least about 85% of the light energy incident thereon. In a preferred embodiment, backlight 10" reflects at least about 95% of the light energy incident thereon. In one embodiment, light guide 12" may be constructed of a substantially non-absorptive material, such as acrylic, polycarbonate, poly (methyl-methacrylate) (PMMA), and the like. The artisan of ordinary skill will readily recognize that light guide 12" may be constructed of other non-absorptive materials. These are considered within the scope and spirit of the present invention. It is generally desirable that light guide 12" absorbs less than about 5% of the reflected light energy incident thereon. In one exemplary embodiment, light guide 12" absorbs less than about 1% of the reflected light energy incident thereon. In another exemplary embodiment, light guide 12" absorbs less than about 0.5% of the reflected light energy incident thereon.

Reflective film 14" may be constructed from any material that reflects (preferably in a diffuse manner) a high percentage (e.g., at least about 95%) of the light energy incident thereon, such as a highly reflective silver or aluminum coating, a diffusive white coating containing barium sulfate (e.g., similar to those used in white calibration standards), magnesium oxide (e.g., in a binder material) or organic materials, such as Spectralon® (available from Labsphere, Inc., of North Sutton, N.H.) or films like Melinex® 329 (available from DuPont de Nemours Company, Inc., of Wilmington, Del.), and the like. The artisan of ordinary skill will readily recognize that reflective film 14" may be constructed of other highly reflective materials. Such other materials are considered within the scope and spirit of the present invention. In a generally desirable embodiment, reflective layer 14" reflects at least about 98% of the light energy incident thereon. Tests completed pursuant with development of the present invention have indicated that the major loss in current commercial white film reflectors is due to back light leakage. According to the present invention, thicker or more diffusing materials, such as barium sulfate, may increase substantially the reflectivity of this component. For example, test results for a layer 14" fabricated from barium sulfate coated onto glass have shown a reflectivity of about 98.5%.

Referring now to FIG. 4, a fiber optic backlight 70 of the present invention is illustrated. Fiber optic backlight 70 includes a light source 71, a bundle of optical fibers 72, and a highly reflective layer 14". Light source 71 may be a small incandescent light or any source capable of generating moderately bright white light. Fiber optic backlight 70 may further optionally include one or more lenses 73 for coupling light from light source 71 into the an optically upstream side 72A of the optical fibers 72. Optical fibers 72 are used to guide the light to reflective layer 14" and may be aligned in an orderly fashion (e.g., in a hexagonal, rectangular, square, symmetrical, triangular, or octagonal pattern) or may be randomly dispersed thereon. Optical fibers 72 may be of any type, such as those that are well known in the telecommunications technologies, as well as plastic fibers. It is generally desirable that optical fibers 72 are suitable for use with light in the visible spectrum (i.e., having wavelengths from about 400 to about 800 nanometers). Optical fibers 72 may be further configured to provide relatively uniform illumination to reflective layer 14" (as opposed to providing an array of discrete light points). For example, a portion of the cladding (not shown) on the downstream side 72B of the optical fibers 72 may be locally removed or roughened, which may be accomplished, for example, by mechanical abrading, chemical etching (e.g., in dilute hydrofluoric acid), or any other similar process, to provide such uniform illumination. Reflective layer 14" may be constructed as described hereinabove with respect to FIG. 3.

Figure 5A:
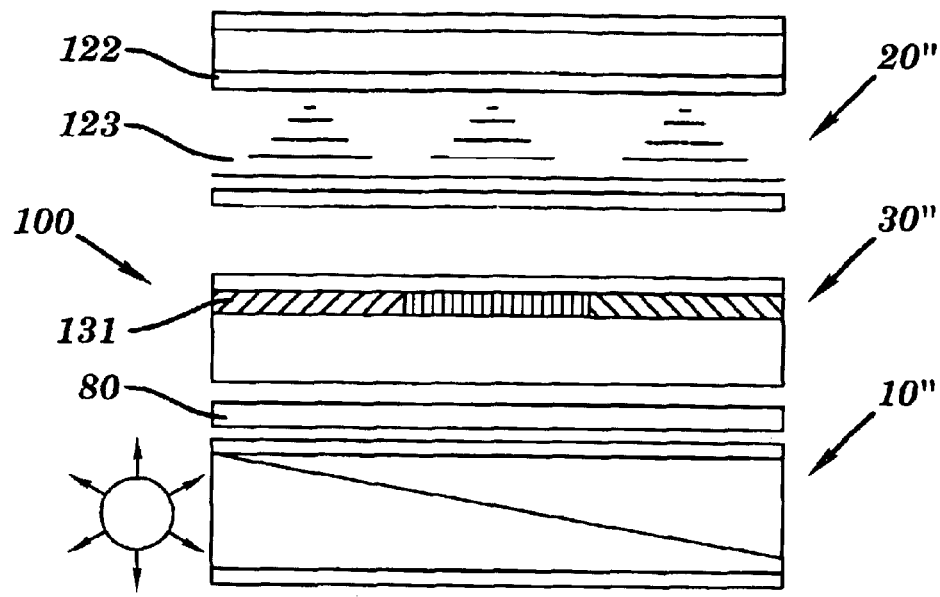
FIG. 5A is a cross sectional, partially exploded schematic representation of one embodiment of a LCD of the present invention, employing the backlight of FIG. 3.

Referring now to FIG. 5A, an LCD 100 of the present invention, including backlight 10", is shown. LCD 100 is desirably configured for systematic light recycling as described above and in the Faris patent. LCD 100 typically includes an electrically addressable array 20" (e.g., as described hereinabove with respect to FIG. 1) having a liquid crystal cell 123 (e.g., including a 90° twisted nematic LC) and addressing circuitry 122. LCD 100 typically further includes a substantially non-absorptive spectral filtering array 30" including a spectral filtering layer 131. Filtering layer 131 may include any relatively non-absorbing color filter, such as a cholesteric liquid crystal polarizing layer, an interference thin film stack, a Bragg reflector constructed of birefringent polymers (e.g., a dual brightness enhancement film (DBEF) manufactured by 3M, St Paul, Minn.) or a holographic filter. In one generally desirable embodiment, filtering layer 131 includes a cholesteric liquid crystal polarizing layer. Cholesteric liquid crystal polarizing layers are discussed in further detail in U.S. Pat. Nos. 5,691,789 and 6,034,753 to Li, et al., and in U.S. patent application Ser. No. 09/885,742, entitled "Backlight Units For Liquid Crystal Displays", to He and Faris, filed on Jun. 20, 2001, each of which is fully incorporated herein by reference. LCD 100 typically further includes a relatively broadband, reflective polarizer 80 interposed between backlight 10" and spectral filtering array 30". Reflective polarizer 80 is "broadband" in the sense that it polarizes incident light at substantially all visible wavelengths (i.e., having wavelengths from about 400 to about 800 nanometers). Exemplary reflective polarizers 80 may include Bragg reflectors constructed of birefringent polymers (e.g., DBEF manufactured by 3M, St Paul, Minn.), which transmits linearly polarized light and a relatively broadband cholesteric liquid polarizing layer (such as described in the references cited hereinabove in this paragraph), which transmits circularly polarized light. LCD 100 may optionally include other layers, which are desirably substantially non-absorbing, such as linear polarizers, quarter-wave retarders, diffusers, transparent substrates, and the like.

Figure 5B:
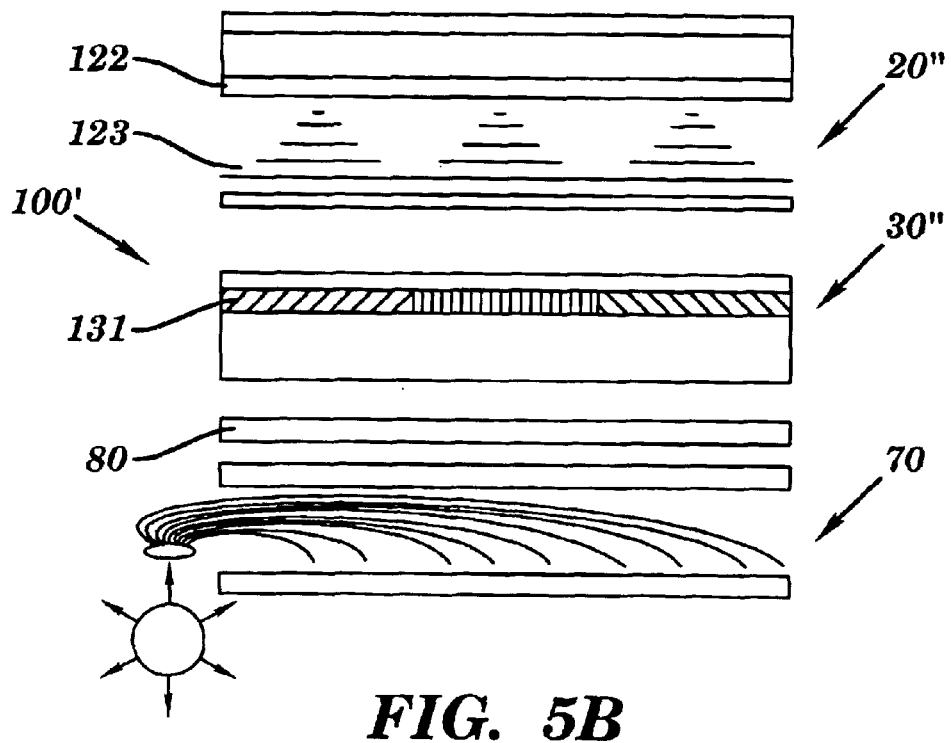
FIG. 5B is a cross sectional, partially exploded schematic representation of another embodiment of a LCD of this invention, employing the backlight of FIG. 4.

Referring now to FIG. 5B, in another embodiment, LCD 100' includes backlight 70 (FIG. 4). As shown, LCD 100' is substantially similar to LCD 100 with the exception that it includes a fiber optic backlight 70 rather than backlight 10".

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A backlight for a liquid crystal display employing light recycling, said backlight comprising:
   a light source;
   a bundle of optical fibers, said optical fibers including an optically upstream side and an optically downstream side, said optical fibers further including a cladding material;
   a reflective layer fabricated from a highly reflective material, said material being selected from the group comprising aluminum, silver, and barium sulfate, magnesium oxide, and organic materials, wherein said reflective layer reflects at least 95% of light energy from said optical fibers incident thereon and wherein said optically downstream side of said optical fibers transmits light energy incident in a plane normal to the plane of said reflective layer; and
   wherein said bundle of optical fibers is configured to receive light from said light source and distribute the light to said reflective layer.

2. The backlight of claim 1 wherein said light source is an incandescent lamp.

3. The backlight of claim 1 further comprising one or more lenses configured to couple light from said light source into said optically upstream side of said optical fibers.

4. The backlight of claim 1 wherein said optically upstream side of said optical fibers is positioned in operative engagement with said light source for coupling light therein.

5. The backlight of claim 1 wherein said optically downstream side of said optical fibers are distributed in a substantially orderly pattern on said reflective layer, said orderly pattern being selected from the group comprising hexagonal, rectangular, square, symmetrical, triangular, and octagonal.

6. The backlight of claim 1 wherein said optically downstream side of said optical fibers are distributed in a substantially random pattern on said reflective layer.

7. The backlight of claim 1 wherein said cladding is removed from a portion of said optically downstream side of said optical fibers.

8. The backlight of claim 1 wherein said cladding is roughened on a portion of said optically downstream side of said optical fibers.

9. The backlight of claim 1 wherein said reflective layer comprises barium sulfate.

10. The backlight of claim 1 wherein said backlight reflects at least 85% of light energy incident thereon.

11. The backlight of claim 1 wherein said backlight reflects at least 95% of light energy incident thereon.

12. A liquid crystal display comprising:
the backlight of claim 1;
an electrically addressable array including a liquid crystal cell;
a substantially non-absorptive filtering array; and
a broadband polarizer.

13. The liquid crystal display of claim 12 wherein said filtering array comprises at least one member selected from the group consisting of a cholesteric liquid crystal polarizing layer, an interference thin film stack, a Bragg reflector constructed of birefringent polymers, and a holographic filter.

14. The liquid crystal display of claim 12 wherein said filtering array comprises a cholesteric liquid crystal polarizing layer.

15. The liquid crystal display of claim 12 wherein said broadband polarizer comprises a cholesteric liquid crystal polarizing layer.

16. A method for fabricating a backlight for a liquid crystal display, said method comprising:
providing a light source;
providing a reflective layer fabricated from a highly reflective material, said material being selected from the group comprising aluminum, silver, and barium sulfate, wherein said reflective layer reflects at least 95% of light energy incident thereon;
providing a bundle of optical fibers, said optical fibers including an optically upstream side and an optically downstream side, said optical fibers further including a cladding material;
positioning said optically upstream side of said optical fibers in operative engagement with said light source; and
positioning said optically downstream side of said optical fibers in operative engagement with said reflective layer, said optically downstream side of said optical fibers arranged to transmit light energy incident in a plane normal to the plane of said reflective layer.

17. The method of claim 16 wherein said positioning said optically upstream side comprises interposing at least one lens between said light source and said upstream side of said optical fibers.

18. The method of claim 16 wherein said positioning said optically down stream side comprises selectively roughening and removing a cladding material from a portion of said optically downstream side of said optical fibers.

19. The method of claim 18 wherein said selectively roughening and removing comprises mechanically abrading said downstream side of said optical fibers.

20. The method of claim 18 wherein said selectively roughening and removing comprises immersing said downstream side of said optical fibers into an aqueous solution of hydrofluoric acid.

21. A method for fabricating a liquid crystal display, said method comprising:
providing a light source;
providing a reflective layer fabricated from a highly reflective material, said material being selected from the group comprising aluminum, silver, and barium sulfate, wherein said reflective layer reflects at least 95% of light energy incident thereon;
providing a bundle of optical fibers, said optical fibers including an optically upstream side and an optically downstream side, said optical fibers further including a cladding material;
positioning said optically upstream side of said optical fibers in operative engagement with said light source wherein said optically downstream side of said optical fibers transmits light energy incident in a plane normal to the plane of said reflective layer;
positioning said optically downstream side of said optical fibers in operative engagement with said reflective layer;
superposing a substantially non-absorptive spectral filtering array with said reflective layer; and
superposing an electrically addressable array including a liquid crystal cell with said reflective layer.

* * * * *